United States Patent [19]

Spence et al.

[11] Patent Number: 4,731,002
[45] Date of Patent: Mar. 15, 1988

[54] TRIPLE-WALL FOAM COEXTRUSION APPARATUS

[75] Inventors: Steven E. Spence; Robert F. Shamet; Flavio Da Silva; Horst Eigruber, all of McPherson, Kans.

[73] Assignee: American Maplan Corporation, McPherson, Kans.

[21] Appl. No.: 932,636

[22] Filed: Nov. 19, 1986

[51] Int. Cl.[4] .............................................. B29C 47/12
[52] U.S. Cl. .............................. 425/133.1; 264/45.9; 264/171; 425/376 R; 425/462
[58] Field of Search ...................... 264/171, 173, 45.9, 264/45.8, 45.1; 425/113, 114, 129 R, 130, 131.1, 133.1, 133.5, 190, 192 R, 376 R, 376 A, 378 R, 379 R, 461, 462, 465, 817 C

[56] References Cited

U.S. PATENT DOCUMENTS

| 3,266,093 | 8/1966 | Corbett | 425/133.1 |
| 3,933,960 | 1/1976 | Cameron et al. | 264/173 |
| 3,947,177 | 3/1976 | Eckardt | 264/45.1 |
| 3,966,861 | 6/1976 | Papesh et al. | 264/173 |
| 3,994,644 | 11/1976 | Hegler et al. | 264/173 |
| 4,125,585 | 11/1978 | Rosenbaum | 264/173 |
| 4,364,882 | 12/1982 | Doucet | 264/45.9 |

FOREIGN PATENT DOCUMENTS

| 2528278 | 12/1976 | Fed. Rep. of Germany | 264/173 |
| 53-14105 | 5/1978 | Japan | 425/133.1 |
| 55-4571 | 1/1980 | Japan | 264/45.9 |
| 56-155749 | 12/1981 | Japan | 264/45.9 |

Primary Examiner—Jeffery Thurlow
Assistant Examiner—J. Fortenberry
Attorney, Agent, or Firm—Karl F. Ross; Herbert Dubno

[57] ABSTRACT

A triple-wall foam coextrusion apparatus in which inner and outer layers of one synthetic resin material are coextruded with an intermediate layer of another synthetic resin material, and wherein the passages for the first material are inclined to the axis along which the second material is extruded around a spider to ensure uniform flow.

4 Claims, 2 Drawing Figures

TRIPLE-WALL FOAM COEXTRUSION APPARATUS

FIELD OF THE INVENTION

The present invention relates to a triple-wall foam coextrusion apparatus and, more particularly to an extrusion head which is capable of extruding tubular elements in which a relatively thick intermediate layer is sandwiched between inner and outer layers of the same material, at least the intermediate layer being composed of a synthetic resin foam.

BACKGROUND OF THE INVENTION

It is already known to provide multilayer extrusion heads in which two or more layers or walls are extruded in a structure by passing the flow of one synthetic resin material through one passage and causing another synthetic resin material to flow codirectionally with the first flow, around the latter so as to meet it at a point in which the flows join to provide a multilayer structure.

One such device is illustrated and described in U.S. Pat. No. 4,364,882.

In that device, the flow from an extruder is passed axially and split into two generally annular streams which continue along separate paths until they meet a codirectionally moving stream from a second extruder which is forced into an annular passage between the first two streams.

When the streams meet, they form a triple-wall coextrusion which can be condensed in thickness, if desired, to emerge from the extrusion head as a tubular structure having inner and outer layers which derive from the synthetic resin material of the first extruder, and an intermediate layer sandwiched and bonded to the outer and inner layers, which derives from the second extruder.

Problems are encountered with such systems in part because the passage communicating with the intermediate annular passage is at right angles to the latter and to the axis of the extrusion head.

When a right-angle flow from a radial passage, for example into an annular passage is effected, the flow distribution tends to be irregular and such irregularities can result in a defect in the operation and in the product made.

OBJECTS OF THE INVENTION

It is, therefore, the principal object of the present invention to provide an improved triple-wall foam coextrusion apparatus whereby the drawbacks of this earlier system can be avoided.

Another object of the invention is to provide a coextrusion head for producing tubular bodies having an inner and outer layer sandwiching between them an intermediate layer of a material different from the inner and outer layers, which operates with greater regularity over longer periods to produce defect-free tubular products with high efficiency.

It is another object of the invention to provide an improved apparatus for the purposes described which is easy to assemble and maintain.

SUMMARY OF THE INVENTION

It has now been found that these objects can be attained by providing the outer annular passage and the central passage for the outer layer and the inner layer, respectively, so that they originate at a location downstream of the location at which an axial flow of the synthetic resin for the intermediate layer is caused to spread into an annular flow.

Specifically, therefore, it is possible to deliver the synthetic resin material for the outer and the inner layer through relatively short passages inclined at an angle to the axis of the head, preferably at an angle of about 60° in the direction of flow of the several streams, from the point at which this synthetic resin is split into two streams.

In this apparatus, the extrusion head for the foamed intermediate layer communicates with an axial extending passage in which a spider is provided to spread the axial flow of this synthetic resin into an annular axial flow of this synthetic resin into an annular axial stream which meets the axial flows of the synthetic resin introduced at an acute angle to the axis of the apparatus from the other extruder.

The coextrusion apparatus can thus comprise:

a body formed with an intermediate axial passage communicating at one end with a source of a foamable synthetic resin adapted to form an intermediate wall of a triple wall coextrusion;

a spider in the intermediate passage formed with a central member extending along the intermediate passage and diverting a flow of the foamable synthetic resin around the spider, the spider having an inner passage with an upstream end coaxial with the intermediate passage and terminating in the intermediate passage at a downstream end of the central member and the inner passage;

means forming in the body an outer passage coaxial with the intermediate and inner passages and extending axially over part of the length of the member around the intermediate passage, the outer passage having a downstream end and an upstream end;

a feed fitting secured to the body and connected to a second source of synthetic resin adapted to form inner and outer walls of the coextrusion, the feed fitting being formed with an inlet channel including an acute angle with an axis of the body and the passages and converging toward the axis in a direction of flow of the synthetic resins, a first distribution channel diverging from the feed channel and opening into the upstream end of the inner passage, and a second distribution channel diverging from the feed channel and opening into the upstream end of the outer passage, both of the distribution channels being inclined to the axis at the acute angle where the distribution channels open into the inner and outer passages, respectively; and a cone positioned at the downstream end of the central body for deflecting outwardly an inner stream of synthetic resin from the inner passage to form an inner wall of the coextrusion, deflecting outwardly a stream of the foamable synthetic resin adapted to form the intermediate wall on the inner wall, and deflecting outwardly an outer stream of synthetic resin onto the intermediate wall to form an outer wall in the intermediate wall.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
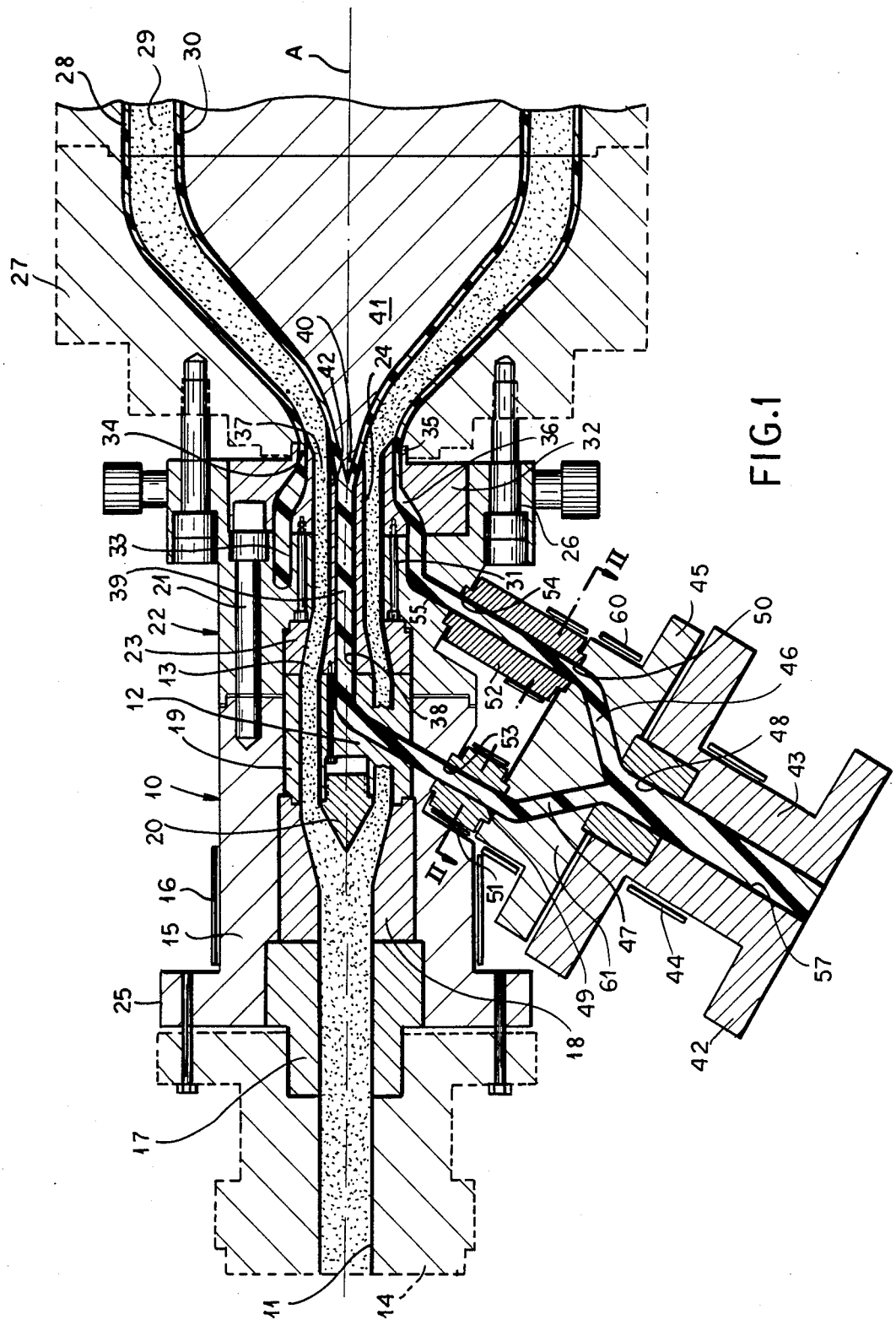
FIG. 1 is an axial section through an apparatus embodying the invention.
Figure 2:
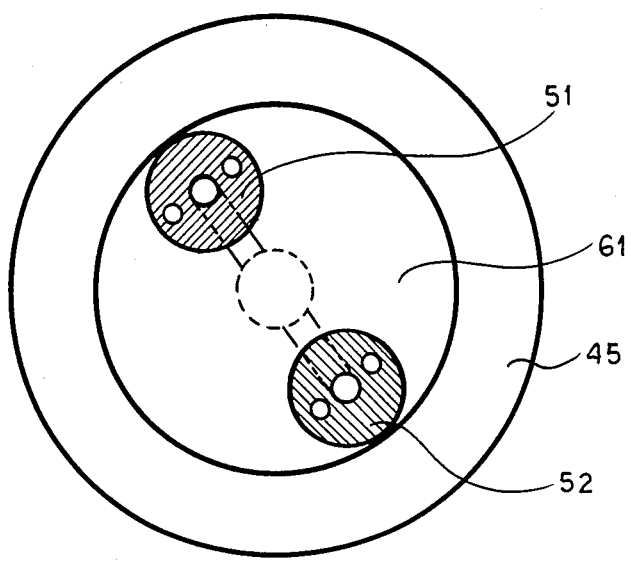
FIG. 2 is a cross section taken along the line II—II of FIG. 1.

In the drawing, there is shown a body 10 provided with an axial passage 11 which is expanded by a spider 12 into an annular passage 13 for a foaming synthetic resin stream or flow from an extruder connected at an upstream end 14 of this passage of the apparatus.

The body 10 is formed by a first member 15 which is surrounded by a heating band to maintain a temperature sufficient to heat the synthetic resin and maintain the latter in a flowable state. The passage 11 within the body 10 is defined by an assembly of sleeves 17, 18, 19 which are axially aligned with one another and can interfit with one another and with the body 15, the sleeve 19 supporting the spider 12 which has an end piece 20 threaded into the spider 12 and of a conical configuration diverging in the downstream direction, i.e. to the right, to spread the axial flow into an annular stream.

A plurality of bolts of which one can be seen at 21 serve to connect the body 10 to a body 22 which receives the sleeve 23 to continue the passage to the right, the passage converging within the sleeve 23 toward a generally cylindrical extension 24 of the spider.

The bodies 10 and 22 are provided with flanges 25 and 26 which are used to connect the head to the extruder adapter 14 and to a die 27 which, as in the aforementioned patent, can form an annular channel for the triple-wall coextrusion which first diverges and then converges and decreases in thickness until the coextrusion emerges as a tube having an outer layer 28 which need not be composed of a foamable material, an intermediate layer 29 of highly foamed material, and an inner layer 30 of the same material as the outer layer 28.

Bolts 31 connect member 22 to a die pin spacedly surrounded by the bushing 32 and which can form the end of the coextrusion head therewith.

Within the body 22 and between the die pin and the bushing 32, an annular passage 33 is defined which begins well downstream of the point at which the intermediate flow becomes annular. The passage 33 terminates in a narrow slot 34 within a symmetrical boss 35 at the mouth of the extrusion head. The cylindrical boss 35 terminates in the same plane transverse to the axis A of the head, as the extension 24 of the spider so that the flow 36 of synthetic resin for the outer layer will meet the flow 37 of the synthetic resin of the intermediate layer.

The spider 12 is also formed with an axial bore 38 through which a flow 39 of the synthetic resin forming the inner layer 30 can pass axially to the end of the extension 24. A conical deflecting tip 40 of a cone 41 of the extrusion die reaches into the axial passage 38 and defines with divergent lip 42 thereof, a narrow annular slot through which the inner layer 30 emerges to join the other two layers at the mouth of the extrusion head.

The inner and outer layers are supplied by a seoond extruder which may be connected to the apparatus at flange 42 of a body 43 provided with a heating band 44 and flanged in turn to a separator 45 which has a pair of mutually divergent bores 46 and 47 extending from a common inlet bore 48.

The bores 46 and 47 terminate in orifices 49 and 50 which are connected by tubular spacers 51 and 52 to the orifices 53 and 54 of the bodies 10 and 22, respectively. An inclined passage 55 connects the orifice 54 with the annular passage 33 whereas an inclined passage 56 similarly connects the orifice 53 with the axial passage or bore 38 in the spider. The passage 56 may pass through one of the webs supporting the central member of the spider in the body 15.

The passage 57 in the adapter 43 extends at an angle of the axis A of about 60° in the flow direction, i.e. to the right and each of the bores or passages 53, 54, which are parallel to one another, similarly open into the respective bores 38 and 33 at corresponding angles in the flow direction.

It has been found that such angled flow is essential for uniform production of tubular bodies.

Another heating band 60 can surround the body 61 provided with the separator 45 and the bores 46 and 47.

In operation, a relatively dense synthetic resin stream, which may be foamed or not, is forced at an angle to the axis through the passages 55 and 56 to the bore 38 and the annular passage 33 and emerges to bond to the centrally extruded intermediate layer 29.

What is claimed is:

1. A triple-wall foam coextrusion apparatus, comprising:
    a body formed with an intermediate axial passage communicating at one end with a source of a foamable synthetic resin adapted to form an intermediate wall of a triple wall coextrusion;
    a spider in said intermediate passage formed with a central member extending along said intermediate passage and diverting a flow of said foamable synthetic resin around said spider, said spider having an inner passage with an upstream end coaxial with said intermediate passage and terminating in said intermediate passage at a downstream end of said central member and said inner passage;
    means forming in said body an outer passage coaxial with said intermediate and inner passages and extending axially over part of the length of said member around said intermediate passage, said outer passage having a downstream end and an upstream end;
    a feed fitting secured to said body and connected to a second source of synthetic resin adapted to form inner and outer walls of said coextrusion, said feed fitting being formed with a feed channel having an axis at an acute angle to an axis of said body and said passages and converging toward said axis of said body in a direction of flow of said synthetic resins, a first distribution channel diverging from said feed channel and opening into said upstream end of said inner passage, and a second distribution channel diverging from said feed channel and opening into said upstream end of said outer passage, both of said distribution channels being inclined to said axis of said body at said acute angle where the distribution channels open into the inner and outer passages, respectively; and
    a cone positioned at said downstream end of said central body for deflecting outwardly an inner stream of synthetic resin from said inner passage to form an inner wall of the coextrusion, deflecting outwardly a stream of said foamable synthetic resin adapted to form said intermediate wall on said inner wall, and deflecting outwardly an outer stream of synthetic resin onto said intermediate wall to form an outer wall in said intermediate wall, said feed channel being parallel to said distribution channels and is connected thereto by a pair of mutually divergent bores opening into said distribution channels from said feed channel, said mutually divergent bores being provided in a member formed with said mutually divergent bores and which is connected to said body by respective tubular spacers of different lengths, each forming part of a respective one of said distribution channels.

2. The apparatus defined in claim 1 wherein said member formed with said mutually divergent bores is surrounded by a heating band.

3. The apparatus defined in claim 2 wherein said body is surrounded by a heating band.

4. The apparatus defined in claim 3 wherein said first distribution channel extends through said spider to said inner passage.

* * * * *